(12) United States Patent
Siriwardane et al.

(10) Patent No.: US 8,470,276 B1
(45) Date of Patent: Jun. 25, 2013

(54) PROCESS FOR $CO_2$ CAPTURE USING A REGENERABLE MAGNESIUM HYDROXIDE SORBENT

(75) Inventors: Ranjani V. Siriwardane, Morgantown, WV (US); Robert W. Stevens, Jr., Morgantown, WV (US)

(73) Assignee: U.S. Department of Energy, Washington, DC (US)

( * ) Notice: Subject to any disclaimer, the term of this patent is extended or adjusted under 35 U.S.C. 154(b) by 436 days.

(21) Appl. No.: 12/720,766

(22) Filed: Mar. 10, 2010

(51) Int. Cl.
*B01D 53/62* (2006.01)
*B01D 53/96* (2006.01)

(52) U.S. Cl.
USPC ............................ 423/225; 423/220; 423/230

(58) Field of Classification Search
USPC .......................................... 423/220, 225, 230
See application file for complete search history.

(56) References Cited

U.S. PATENT DOCUMENTS 7,314,847 B1    1/2008    Siriwardane

OTHER PUBLICATIONS

The Engineering ToolBox, "Solubility of Gases in Water." (2005) Viewed at http://www.engineeringtoolbox.com/gases-solubility-water-d_1148.html on Nov. 12, 2009.*

Jung et al, "A technical and economic evaluation of CO2 separation from power plant flue gases with reclaimed Mg(OH)2," Clean Techn Environ Policy 6 (2004) 201-212, (Published online on Dec. 6, 2003).
Siriwardane et al, "Novel Regenerable Magnesium Hydroxide Sorbents for CO2 Capture at Warm Gas Temperatures." Ind. Eng. Chem. Res. 2009, 48, 2135-214.1, (Published on Web as of Dec. 29, 2008).

* cited by examiner

*Primary Examiner* — Stuart Hendrickson
*Assistant Examiner* — Daniel Berns
(74) *Attorney, Agent, or Firm* — James B. Potts; Mark P. Dvorscak; John T. Lucas

(57) ABSTRACT

A process for $CO_2$ separation using a regenerable $Mg(OH)_2$ sorbent. The process absorbs $CO_2$ through the formation of $MgCO_3$ and releases water product $H_2O$. The $MgCO_3$ is partially regenerated through direct contact with steam, which acts to heat the magnesium carbonate to a higher temperature, provide heat duty required to decompose the magnesium carbonate to yield MgO and $CO_2$, provide an $H_2O$ environment over the magnesium carbonate thereby shifting the equilibrium and increasing the potential for $CO_2$ desorption, and supply $H_2O$ for rehydroxylation of a portion of the MgO. The mixture is polished in the absence of $CO_2$ using water product $H_2O$ produced during the $CO_2$ absorption to maintain sorbent capture capacity. The sorbent now comprised substantially of $Mg(OH)_2$ is then available for further $CO_2$ absorption duty in a cyclic process.

19 Claims, 2 Drawing Sheets

PROCESS FOR $CO_2$ CAPTURE USING A REGENERABLE MAGNESIUM HYDROXIDE SORBENT

STATEMENT OF GOVERNMENTAL SUPPORT

The United States Government has rights in this invention pursuant to the employer-employee relationship of the Government to the inventors as U.S. Department of Energy employees and site-support contractors at the National Energy Technology Laboratory.

TECHNICAL FIELD

A process for $CO_2$ separation using a regenerable $Mg(OH)_2$ sorbent. The process absorbs $CO_2$ through the formation of $MgCO_3$ and releases water product $H_2O$. The $MgCO_3$ is partially regenerated through direct contact with steam, which acts to heat the magnesium carbonate to a higher temperature, provide heat duty required to decompose the magnesium carbonate to yield $MgO$ and $CO_2$, provide an $H_2O$ environment over the magnesium carbonate thereby shifting the equilibrium and increasing the potential for $CO_2$ desorption, and supply $H_2O$ for rehydroxylation of a portion of the $MgO$. The partial regeneration produces a mixture of $Mg(OH)_2$ and $MgO$. In order to rehydroxylate the remaining $MgO$ in order to produce a sorbent of substantially all $Mg(OH)_2$ and thereby maintain the $CO_2$ capture capacity of the sorbent, the mixture is polished in the absence of $CO_2$ using water product $H_2O$ produced during the $CO_2$ absorption. The sorbent now comprised substantially of $Mg(OH)_2$ is then available for further $CO_2$ absorption duty in a cyclic process.

BACKGROUND OF THE INVENTION $CO_2$ capture is the separation of $CO_2$ from emissions sources or the atmosphere. From emissions sources, $CO_2$ is recovered in a concentrated stream that is amenable to sequestration or conversion. $CO_2$ capture technologies are a current area of significant interest, and technologies are needed which allow for viable $CO_2$ capture in conjunction with fossil fuel use.

Generally speaking, $CO_2$ capture can be conducted as a post-combustion or pre-combustion process. Post-combustion processes are based on chemical absorption in relatively low temperature, low $CO_2$ partial pressure conditions such as those typically found in flue gas.

Typical absorbents used are amines and carbonates. In a typical process, the flue gas contacts the chemical absorbent in sorption column, the $CO_2$ is transferred from the flue gas to the absorbent, and there are two out-going flows from sorption column; a cleaned gas-stream with low $CO_2$ content and a stream containing water, absorbent and $CO_2$. After the absorption process, the absorbent and the $CO_2$ are separated in a regeneration column. When heated, the absorbents ability to retain $CO_2$ is reduced, resulting in regeneration of the absorbent, which can then be re-used. The $CO_2$ leaves the regeneration column as a gas stream of high $CO_2$ purity.

Carbon dioxide capture as described above is relatively energy intensive. Because $CO_2$ is present at dilute concentrations and low pressure, high volume of gas must be treated. A relatively low $CO_2$ capture capacity of the absorbent also has tremendous impact. For example, the $CO_2$ capture capacity of commercial liquid amine processes is about 0.68 mole/kg. Since the capacity is low, either large reactors or frequent regeneration is necessary. Additionally, trace impurities such as sulfur dioxide, nitrogen oxides, and particulate matter in the flue gas can degrade sorbents and reduce the effectiveness of certain $CO_2$ capture processes. Large parasitic loading may also result, as compressing captured or separated $CO_2$ from atmospheric pressure to pipeline pressure (about 2,000 psia) represents a large auxiliary power load on the overall power plant system.

A more effective alternative is pre-combustion $CO_2$ capture. Pre-combustion $CO_2$ capture relates to gasification plants, where fuel is converted into gaseous components by applying heat under pressure and chemically decomposing the fuel to produce synthesis gas (syngas), which is composed of hydrogen ($H_2$), carbon monoxide (CO), and minor amounts of other gaseous constituents. The syngas may then be processed in a water-gas-shift reactor, which converts the CO to $CO_2$ and increases the $CO_2$ and $H_2$ molecular concentrations to about 40 percent and 55 percent, respectively. The $CO_2$ can then be captured from the synthesis gas prior to combustion in a combustion turbine. Because the $CO_2$ is relatively concentrated in the synthesis gas stream, separating the $CO_2$ becomes much more effective, as the high partial pressure and high chemical potential improves the driving force for various types of separation and capture technologies. However, typically used pre-combustion technologies involve solvent absorption of $CO_2$ at low temperature and relatively high pressure, followed by a decrease in pressure for $CO_2$ release and recovery. This process results in a low temperature, low pressure $CO_2$ stream, and the required cooling and subsequent reheating of the fuel stream necessary for combustion decreases the plant thermal efficiency and increases cost. Additionally, solvent-based pre-combustion $CO_2$ removal processes may be sensitive to water content in the synthesis gas stream, and require water removal prior to $CO_2$ capture for effective operation.

The energy efficiency of pre-combustion capture would be significantly improved in Integrated Gasification Combined Cycle (IGCC) processes if the sorbent were operational at moderate or high temperatures. Currently, water-gas shift reactors in IGCC processes elevate gas streams to 200 to 300° C., so as to transform synthesis gas to $CO_2$, $H_2$, and steam. As discussed above, these gases must be cooled before current $CO_2$ removal technologies can be used. Thus, there are considerable advantages in developing sorbents for $CO_2$ capture at moderate to hot gas temperatures, as the hot gas remaining after $CO_2$ removal can be directly introduced to the turbine systems. If $CO_2$ can be removed from the gas stream directly after the water-gas shift reactor, a pure $H_2$ stream can be obtained at high temperatures for various applications. Aside from use in IGCC applications, sorbents for moderate to hot gas temperatures also can be useful for chemical and metallurgical applications.

Some minerals will undergo thermodynamically favorable reactions with $CO_2$, separating it from a gas stream and forming a stable, chemically bonded product. These have been investigated largely for mineral carbonation, where carbon dioxide is chemically reacted with alkaline and alkaline-earth metal oxide or silicate minerals to form stable solid carbonates for long-term $CO_2$ sequestration. Using magnesium hydroxide ($Mg(OH)_2$) for the formation of magnesium carbonate ($MgCO_3$) is among the mineral processes which have been investigated. Decomposition of the formed carbonates with temperature has also been investigated for cycles utilizing regenerable sorbents, however, in the typical cycle where regeneration of the carbonate loaded sorbents is limited solely to thermal decomposition through increased temperature, these sorbents have a disadvantage in that decreased reactivity tends to result from multiple absorption/regeneration cycles. It would be advantageous if a mineral based sorbent such as $Mg(OH)_2$ could be used in a cyclic absorption/desorption process designed to maintain sorbent reactivity. It would be further advantageous if the sorbent were operational at moderate or high temperatures.

Accordingly, it is an object of this disclosure to provide a process utilizing a regenerable $Mg(OH)_2$ sorbent for the separation of $CO_2$ from a gaseous stream for the production of a moderate or high temperature $CO_2$-depleted gas stream.

Further, it is an object of this disclosure to provide a process utilizing a regenerable $Mg(OH)_2$ sorbent for the separation of $CO_2$ from a gaseous stream where the regenerable sorbent maintains activity over a number of absorption/desorption cycles.

Further, it is an object of this disclosure to provide a process utilizing a regenerable $Mg(OH)_2$ sorbent for the separation of $CO_2$ from a gaseous stream using steam regeneration of the $Mg(OH)_2$ sorbent followed by a polishing process to maintain sorbent activity.

Further, it is an object of this disclosure to provide a process utilizing a regenerable $Mg(OH)_2$ sorbent for the separation of $CO_2$ from a gaseous stream using steam regeneration followed by a polishing process, where the polishing process utilizes water liberated during the $CO_2$ absorption process such that water requirements are reduced.

Further, it is an object of this disclosure to provide a process utilizing a regenerable $Mg(OH)_2$ sorbent for the separation of $CO_2$ from a shifted syngas stream comprised of $H_2$, $H_2O$, and $CO_2$ in a pre-combustion process.

Further, it is an object of this disclosure to provide a process utilizing a regenerable $Mg(OH)_2$ sorbent for the separation of $CO_2$ from a shifted syngas stream comprised of $H_2$, $H_2O$, and $CO_2$ prior to $H_2$ combustion in an IGCC plant, utilizing steam generated by the IGCC plant.

Further, it is an object of this disclosure to provide a process utilizing a regenerable $Mg(OH)_2$ sorbent for the separation of $CO_2$ from a gaseous stream in a manner tolerant to $H_2O$ in the gaseous stream, avoiding requirements for dehydration prior to $CO_2$ separation.

Further, it is an object of this disclosure to provide a process utilizing a regenerable $Mg(OH)_2$ sorbent for the separation of $CO_2$ from a gaseous stream at warm gas temperatures, avoiding the necessity for cooling and subsequent reheat of the gaseous stream for pre-combustion $CO_2$ removal.

These and other objects, aspects, and advantages of the present disclosure will become better understood with reference to the accompanying description and claims.

SUMMARY OF INVENTION

The process as disclosed herein utilizes a $Mg(OH)_2$ sorbent for the separation of $CO_2$ from a process gas stream. The process utilizes contact between the process gas stream and the $Mg(OH)_2$ sorbent to remove some portion of the $CO_2$ through a reaction producing $MgCO_3$ and water product. A $CO_2$—depleted gas stream is discharged. $CO_2$ is liberated and the sorbent partially regenerated by contact between the $MgCO_3$ and steam, driving thermal decomposition of the $MgCO_3$ to $Mg(OH)_2$ and MgO. The resulting MgO is then rehydroxylated in a polishing process using the water product liberated during $MgCO_3$ production to complete the regeneration of the $Mg(OH)_2$ sorbent.

The process as disclosed herein provides for separation of $CO_2$ from a process gas stream through contact between the process gas stream and the regenerable $Mg(OH)_2$ sorbent under conditions which allow the reaction:

$$Mg(OH)_2 + CO_2 \rightarrow MgCO_3 + H_2O$$

Following the separation of $CO_2$ according to the above reaction, the $MgCO_3$ produced is substantially separated from the water product $H_2O$ and partially regenerated through direct contact with steam. The steam serves to flush liberated $CO_2$ as well as provide heat duty and $H_2O$ for the following reactions:

$$MgCO_3 \rightarrow MgO + CO_2$$

$$MgO + H_2O \rightarrow Mg(OH)_2$$

Additionally, the steam regeneration provides the heat duty necessary for heating the sorbent, provides an $H_2O$ environment over the $MgCO_3$ to shift equilibrium and increase the potential for $CO_2$ desorption, and provides for rehydroxylation of some portion of the MgO to yield $Mg(OH)_2$.

Following steam regeneration, a mixture of $Mg(OH)_2$ and MgO results. Because complete conversion of MgO to $Mg(OH)_2$ is limited in the presence of $CO_2$, and because the kinetics of $CO_2$ capture are more favorable over $Mg(OH)_2$ than MgO, an additional polishing step is utilized in order to produce a sorbent of substantially all $Mg(OH)_2$. In the polishing step, the mixture of $Mg(OH)_2$ and MgO is separated from liberated $CO_2$ and further rehydroxylated using the water product $H_2O$ produced during the $CO_2$ absorption. This converts remaining MgO in the mixture to $Mg(OH)_2$ and restores the capture capacity of the regenerable $Mg(OH)_2$ sorbent.

The regenerable $Mg(OH)_2$ sorbent used in the novel process can capture $CO_2$ at 150-315° C., and is regenerable at temperatures of 375° C. This offers specific advantage in certain applications, such as the pre-combustion $CO_2$ capture from a shifted syngas stream providing fuel to an IGCC plant, where the hot gas remaining after $CO_2$ removal can be introduced to turbine systems without reheat requirements. The process is also tolerant to $H_2O$ in the gaseous stream, avoiding requirements for dehydration prior to $CO_2$ separation.

The novel process and principles of operation are further discussed in the following description.

DETAILED DESCRIPTION OF THE PREFERRED EMBODIMENTS

Figure 1:
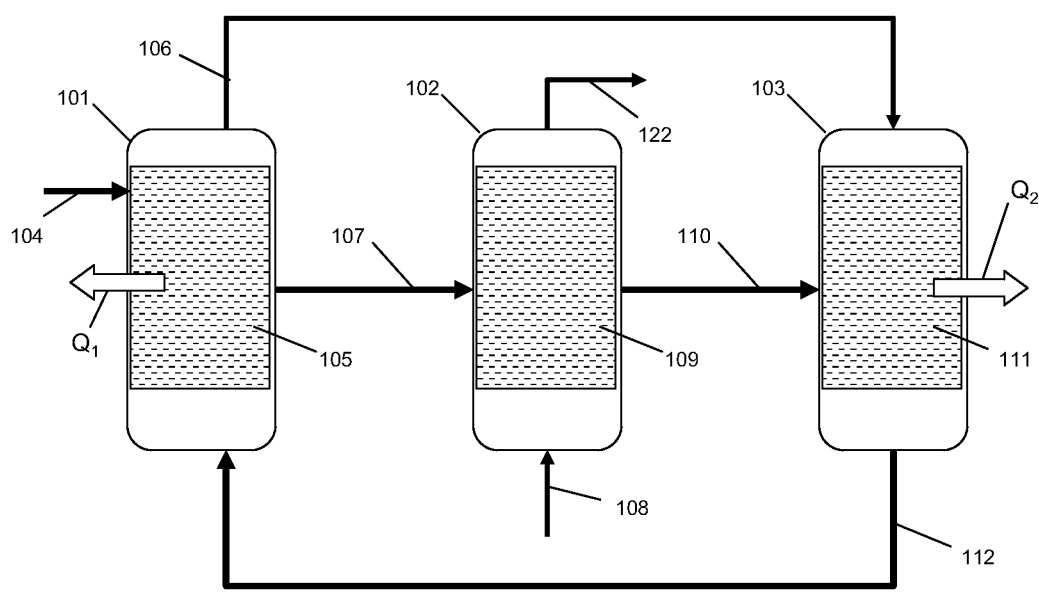
FIG. 1 illustrates a process for the separation of $CO_2$ from a gaseous stream using a regenerable $Mg(OH)_2$ sorbent.

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a process utilizing a regenerable $Mg(OH)_2$ sorbent for the separation of $CO_2$ from a gaseous stream.

As used herein, the term "magnesium hydroxide" means an inorganic compound having the chemical formula $Mg(OH)_2$.

As used herein, the term "magnesium carbonate" means an inorganic compound having the chemical formula $MgCO_3$.

As used herein, the term "magnesium oxide" means an inorganic compound having the chemical formula MgO, also commonly referred to as magnesia.

As used herein, the term "shifted syngas" means a gas mixture substantially comprised of $H_2$, $CO_2$ and $H_2O$. For example, the gas mixture produced when synthetic gas comprised of H₂ and CO is subjected to a water-gas-shift reaction such that CO in the syngas is combined with H₂O to produce CO₂ and H₂.

The process as disclosed herein utilizes a Mg(OH)$_2$ sorbent for the separation of CO$_2$ from a process gas stream. The process utilizes contact between the process gas stream and the Mg(OH)$_2$ sorbent to remove some portion of the CO$_2$ through a reaction producing MgCO$_3$ and water product. A CO$_2$ depleted gas stream is discharged. CO$_2$ is liberated and the sorbent partially regenerated by contact between the MgCO$_3$ and steam, driving thermal decomposition of the MgCO$_3$ to Mg(OH)$_2$ and MgO. The resulting MgO is then rehydroxylated in a polishing process using the water product liberated during MgCO$_3$ production to complete the regeneration of the Mg(OH)$_2$ sorbent.

The regenerable Mg(OH)$_2$ sorbent used in the novel process can capture CO$_2$ at 150-315° C., and is regenerable at temperatures of 375° C. This offers specific advantage in certain applications, such as the pre-combustion CO$_2$ capture from a shifted syngas stream providing fuel to an IGCC plant, where the hot gas remaining after CO$_2$ removal can be introduced to turbine systems without reheat requirements. The process utilizes steam regeneration which provides the heat duty necessary for heating the sorbent and thermally decomposing MgCO$_3$ to yield MgO and CO$_2$, provides an H$_2$O environment over the MgCO$_3$ to shift equilibrium and increase the potential for CO$_2$ desorption, and provides for rehydroxylation of some portion of the MgO to yield Mg(OH)$_2$. Further rehydroxylation in the polishing process restores the CO$_2$ capture capacity during the cyclic process.

The process as disclosed herein provides for separation of CO$_2$ from a process gas stream through contact between the process gas stream and the regenerable Mg(OH)$_2$ sorbent under conditions which allow the reaction:

$$Mg(OH)_2 + CO_2 \rightarrow MgCO_3 + H_2O \quad (1)$$

Following the separation of CO$_2$ according to reaction (1), the MgCO$_3$ produced is substantially separated from the water product H$_2$O and partially regenerated through direct contact with steam. The steam serves to flush liberated CO$_2$ as well as provide the required heat duty and H$_2$O for reactions (2) and (3):

$$MgCO_3 \rightarrow MgO + CO_2 \quad (2)$$

$$MgO + H_2O \rightarrow Mg(OH)_2 \quad (3)$$

Complete rehydroxylation of MgO to Mg(OH)$_2$ in accordance with reaction (3) is unfavorable in the presence of the liberated CO$_2$, so that the steam provides only a partial regeneration to Mg(OH)$_2$ via reaction (3) and produces a mixture comprised of MgO and Mg(OH)$_2$. Within the process disclosed here, in order to substantially complete regeneration of the MgO in the mixture and maintain the capture capacity of the sorbent, the mixture is separated from the liberated CO$_2$ and further rehydroxylated at a lower temperature according to reaction (3), using the water product H$_2$O from reaction (1). This process produces a regenerable Mg(OH)$_2$ sorbent for removal of CO$_2$ from a process gas stream in a cyclic process.

The process as disclosed herein is further described with reference to FIG. 1. FIG. 1 illustrates an absorption reactor 101, a regeneration reactor 102, and a polishing reactor 103. A process gas stream 104 is comprised of H$_2$, CO$_2$, and H$_2$O, and enters absorption reactor 101 as shown. Absorption reactor 101 contains regenerable magnesium hydroxide sorbent 105 comprised of a first magnesium hydroxide, and absorption reactor 101 is at a first temperature, where the first temperature is sufficient for reaction (1) discussed supra to occur.

In absorption reactor 101, process gas stream 104 contacts the regenerable magnesium hydroxide sorbent 105, capturing some portion of the CO$_2$ in process gas stream 105 through reaction (1) and producing magnesium carbonate and water product. The reaction (1) which occurs in absorption reactor 101 is an exothermic reaction, so heat is transferred from absorption reactor 101 with a first heat transfer Q$_1$ to maintain absorption reactor 101 at the first temperature.

The magnesium carbonate produced by reaction (1) is transferred from absorption reactor 101 to regeneration reactor 102 via transfer path 107. Additionally, rehydroxylation stream 106 comprised of the water product from reaction (1) is discharged from absorption reactor 101. Rehydroxylation stream 106 may be further comprised of the process gas stream less the CO$_2$ absorbed.

Regeneration reactor 102 is at a second temperature sufficient for thermal decomposition of magnesium carbonate via reaction (2) to occur. Additionally, regeneration reactor 102 is supplied with steam 108. Steam 108 supplied to regeneration reactor 102 serves multiple functions including: (i) heating the magnesium carbonate from the first temperature to the second temperature in regeneration reactor 102; (ii) providing heat duty required to decompose the magnesium carbonate to yield MgO and CO$_2$, as produced by reaction (2); (iii) providing an H$_2$O environment over the magnesium carbonate thereby shifting the equilibrium and increasing the potential for CO$_2$ desorption, and (iv) reaction with a portion of the MgO produced by reaction (2) to yield Mg(OH)$_2$ according to equation (3). Within regeneration reactor 102, reaction (2) is an endothermic reaction and reaction (3) is an exothermic reaction.

Conducting the reactions within the same reactor reduces the heat duty levied on steam 108 supplied to regeneration reactor 102.

Within regeneration reactor 102, magnesium carbonate decomposes to produce magnesium oxide and gaseous carbon dioxide via reaction (2). CO$_2$ is thereby liberated as gaseous carbon dioxide resulting from reaction (2) in regeneration reactor 102. Additionally, some portion of the magnesium oxide formed reacts with water provided by steam 108, producing a second magnesium hydroxide via reaction (3). Like the first magnesium hydroxide utilized in reaction (1) in absorption reactor 101, the second magnesium hydroxide produced via reaction (3) in regeneration reactor 102 also has the chemical composition Mg(OH)$_2$. The terms "first magnesium hydroxide" and "second magnesium hydroxide" as used in this disclosure are merely meant to distinguish between a magnesium hydroxide participating in reaction (1) in absorption reactor 101 and a magnesium hydroxide produced via reaction (3) in regeneration reactor 102. The gaseous carbon dioxide resulting from reaction (2) occurring in regeneration reactor 102 is discharged from regeneration reactor 102 as separation stream 122. Separation stream 122 may be further comprised of water vapor from steam 108 which does not participate in reaction (3).

When the magnesium carbonate is exposed to steam in regeneration reactor 102, only a portion of the MgO produced by reaction (2) will further undergo reaction (3) to produce Mg(OH)$_2$ because, as stated supra, complete rehydroxylation of MgO to Mg(OH)$_2$ in accordance with reaction (3) is unfavorable in the presence of the liberated CO$_2$ and high temperature conditions. As a result, the process that occurs within regeneration reactor 102 produces a mixture 109 comprised of both Mg(OH)$_2$ and MgO. However, the kinetics of CO$_2$ capture over MgO are much slower than those over Mg(OH)$_2$, so in order to maintain the capture capacity of the regenerable magnesium hydroxide sorbent, it is necessary to transfer the mixture 109 to an environment more favorable for reaction (3), so that the remaining MgO in the mixture 109 can react and a sorbent comprised of substantially all $Mg(OH)_2$ results. Toward this end, the mixture 109 comprised of magnesium oxide and the second magnesium hydroxide is transferred to polishing reactor 103 via transfer path 110.

Polishing reactor 103 is at a third temperature sufficient for reaction (3) discussed supra to occur. Additionally, polishing reactor 103 is supplied with rehydroxylation stream 106 from absorption reactor 101. The water product from reaction (1) in rehydroxylation stream 106 reacts with some portion of the magnesium oxide transferred from regeneration reactor 102 to polishing reactor 103 to produce a third magnesium hydroxide via reaction (3). Because reaction (3) is an exothermic reaction, heat is transferred from polishing reactor 103 by a second heat transfer $Q_2$ to maintain polishing reactor 103 at the third temperature. Additionally, like the second magnesium hydroxide produced in regeneration reactor 102, the third magnesium hydroxide also has the chemical composition $Mg(OH)_2$. The term "third magnesium hydroxide" as used in this disclosure is merely meant to signify a magnesium hydroxide produced via reaction (3) in polishing reactor 103, as opposed to the first magnesium hydroxide participating in reaction (1) in absorption reactor 101 or the second magnesium hydroxide produced via reaction (3) in regeneration reactor 102. Polishing reactor 103 thereby produces polished magnesium hydroxide sorbent 111 in polishing reactor 103, where polished magnesium hydroxide sorbent 111 is comprised of the second magnesium hydroxide produced in regeneration reactor 102 and the third magnesium hydroxide produced in polishing reactor 103.

For a constant pressure process, where the pressure in absorption reactor 101, regeneration reactor 102, and polishing reactor 103 are substantially equivalent, it is expected that the second temperature will be greater than the first temperature. The value of the second temperature is driven by the thermal decomposition of $MgCO_3$ so that absorbed $CO_2$ may be liberated. At a pressure of, for example, 20 atmospheres (atm), in the steam environment provided by regeneration reactor 102, $MgCO_3$ decomposition via reaction (2) initiates at approximately 375° C., and reduced $MgCO_3$ equilibrium levels result as temperature is increased. Following this regeneration at the second temperature, as discussed supra, polishing reactor 103 is utilized to rehydroxylate remaining MgO in the mixture 109 to substantially all $Mg(OH)_2$, in order to maintain $CO_2$ capture capacity. This is accomplished in polishing reactor 103 by providing an environment where MgO and $Mg(OH)_2$ from mixture 109 and water from rehydroxylation stream 106 may substantially equilibrate. If polishing reactor 103 is substantially at the same 20 atm pressure as regeneration reactor 102, then rehydroxylation of the MgO is expected to commence at approximately 300° C., and thermodynamic equilibrium producing substantially all $Mg(OH)_2$ and a minimum of MgO is expected around 200° C. Thus, for the constant pressure process, it is expected that the third temperature will be less than the second temperature. However, exact values of the second temperature and the third temperature may be varied within this process for optimization of results within the specific operating environment, provided that the second temperature is sufficient for thermal decomposition of magnesium carbonate via reaction (2), and the third temperature is sufficient to cause some portion of the MgO in mixture 109 to form $Mg(OH)_2$ via reaction (3).

Following the formation of the polished magnesium hydroxide sorbent 111, the polished magnesium hydroxide sorbent 111 is transferred from polishing reactor 103 back to absorption reactor 101 via transport path 112 to provide regenerable magnesium hydroxide sorbent 105 for absorption reactor 101 in ongoing, cyclic $CO_2$ separation operations.

It is understood that within the process as disclosed the regenerable magnesium hydroxide sorbent 105, the mixture 109, and the polished magnesium hydroxide sorbent 111 may be additionally comprised of other compounds and elements outside of $Mg(OH)_2$, MgO, and $MgCO_3$. For example, the regenerable magnesium hydroxide sorbent 105, the mixture 109, and the polished magnesium hydroxide sorbent 111 may be further comprised of a compound acting as a binder for the formation of sorbent pellets, as is known in the art. Additionally, the regenerable magnesium hydroxide sorbent 105, the mixture 109, and the polished magnesium hydroxide sorbent 111 may be further comprised of elements and compounds generating reactions outside of reactions (1), (2), and (3). Within this process, it is only necessary that the regenerable magnesium hydroxide sorbent 105, the mixture 109, and the polished magnesium hydroxide sorbent 111 are comprised of $Mg(OH)_2$, MgO, and $MgCO_3$ such that reactions (1), (2), and (3) occur within the reaction chambers as disclosed.

Within the process as disclosed, first heat transfer $Q_1$ may be accomplished using a variety of heat sink means known in the art. For example, the heat sink could be a coolant fluid in a heat exchanger, another process technology requiring heat at about or less than the temperature of adsorption, or simply the atmosphere. Non-absorbed components of process gas stream 104 that contact the regenerable magnesium hydroxide sorbent 105 may also remove some exothermic heat during adsorption. Similarly, second heat transfer $Q_2$ may be accomplished using a variety of heat sink means known in the art, such as a coolant fluid in a heat exchanger, another process technology requiring heat at about or less than the temperature of adsorption, or simply the atmosphere. The components of rehydroxylation stream 106 that contact the mixture 109 and polished magnesium hydroxide sorbent 111 may also remove some exothermic heat in polishing reactor 103. In a particular embodiment, first heat transfer $Q_1$ and second heat transfer $Q_2$ are accomplished with a heat exchanger using water as a coolant fluid.

Transport via transport paths 107, 110, and 112 may be accomplished in a variety of ways, including moving bed arrangements, fluidized transfer of pellets, and other means known to those skilled in the art. Similarly, rehydroxylation stream 106 may be cycled from absorption reactor 101 to polishing reactor 103 in a variety of ways, including a pump, a pressure differential between the reactors, and other means known to those skilled in the art.

Figure 2:
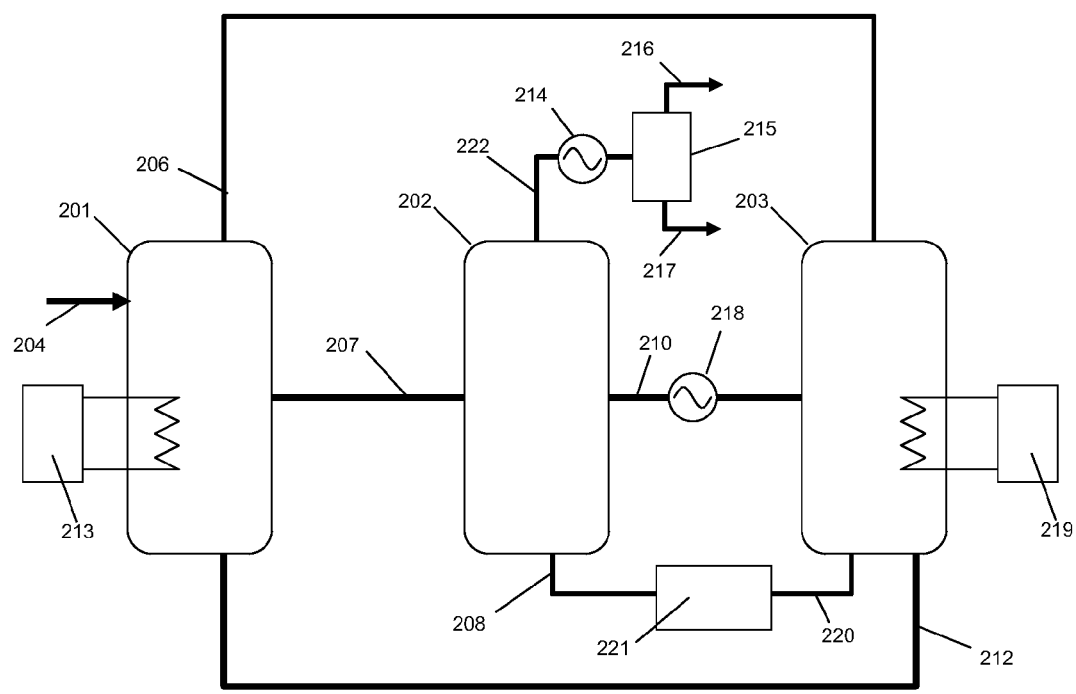
FIG. 2 illustrates an embodiment of the process on a warm gas stream of shifted syngas.

An embodiment of the process is further described with reference to FIG. 2, illustrating pre-combustion $CO_2$ capture from a process gas stream of shifted syngas. At FIG. 2, Process gas stream 204 is comprised of approximately 53.5 mol % $H_2$, 39.4 mol % $CO_2$, and 7.1 mol % $H_2O$, at a temperature of approximately 200° C. and a pressure of 280 psig. Absorption reactor 201 is similarly maintained at approximately 200° C. and a pressure of 280 psig, and holds the regenerable magnesium hydroxide sorbent in an arrangement whereby contact between process gas stream 204 and the regenerable magnesium hydroxide sorbent occur. Under the conditions of absorption reactor 201, the regenerable magnesium hydroxide sorbent absorbs $CO_2$ from the process gas stream 204 via reaction (1), to form magnesium carbonate. Heat exchanger 213 utilizes cooling water at approximately 20° C. to transfer exothermic heat from absorption reactor 201 as reaction (1) proceeds.

It is understood that the production of magnesium carbonate within absorption reactor 201 depends largely on the sorbent utilization factor for the regenerable magnesium hydroxide sorbent. The sorbent utilization factor communicates the accessibility of the active $Mg(OH)_2$ sites within the regenerable magnesium hydroxide sorbent itself, so that magnesium carbonate may result from reaction (1). Those skilled in the art recognize that the sorbent utilization factor may be impacted by a variety of factors within absorption reactor 201, and that maximizing the sorbent utilization factor is desired in order to maximize the $CO_2$ absorbed and minimize the quantity of regenerable magnesium hydroxide sorbent required in the cycle. However, the process as disclosed herein is not limited by a specific sorbent utilization factor arising from conditions within absorption reactor 201. Within this process, it is only necessary that the sorbent utilization factor is sufficient so that some portion of the $CO_2$ in process gas stream 204 reacts with some portion of the magnesium hydroxide sites in the regenerable magnesium hydroxide sorbent to form magnesium carbonate.

Rehydroxylation stream 206 discharges from absorption reactor 201 following $CO_2$ absorption via reaction (1). As discussed supra, rehydroxylation stream 206 is comprised of water product produced via reaction (1), and may be further comprised of the process gas stream less the $CO_2$ absorbed. In the particular embodiment at FIG. 2, rehydroxylation stream 206 is comprised of approximately 53.5 mol % $H_2$ arising from process gas stream 204 and 46.5 mol % $H_2O$ arising from the water product of reaction (1) and $H_2O$ originally introduced by process gas stream 204.

The magnesium carbonate produced by reaction (1) is transferred from absorption reactor 201 to regeneration reactor 202 via transport path 207. It is understood that the magnesium carbonate transferred may be present as a component in a magnesium hydroxide—magnesium carbonate mixture, depending on the sorbent utilization factor resulting from the conditions within absorption reactor 201. For sorbent utilization factors less than 100%, it is expected that some quantity of magnesium hydroxide will exit absorption reactor 201 via transfer path 207 and be carried through the remainder of the process as inert components. However, the process as disclosed herein is not limited by the quantity of magnesium hydroxide transported via transport path 207, and within this process it is only necessary that magnesium carbonate formed via reaction (1) be transferred to regeneration reactor 202 via transport path 207. Transfer via transport path 207 may be accomplished in a variety of ways, including moving bed arrangements, fluidized transfer of pellets, and other means known to those skilled in the art.

Regeneration reactor 202 is at a temperature of approximately 400° C. and a of pressure greater than 10 atmospheres, such as approximately 280 psig Regeneration reactor 202 receives the magnesium carbonate via transport path 207 and further receives a flow of steam 208 from power island 221. In a particular embodiment, power island 221 is a combined cycle combusting $H_2$ and producing generated steam, and providing a portion of that generated steam to regeneration reactor 202. Within regeneration reactor 202, the steam acts to heat the magnesium carbonate from 200° C. to 400° C. and provide heat duty to decompose the magnesium carbonate and produce magnesium oxide and gaseous $CO_2$ via reaction (2). Further, the steam provides an $H_2O$ environment over the magnesium carbonate to increase the potential for $CO_2$ desorption, and provides $H_2O$ to react with a portion of the MgO to yield $Mg(OH)_2$ via equation (3) within regeneration reactor 202. As discussed supra, reaction (2) is an endothermic reaction and reaction (3) is an exothermic reaction, which reduces the required heat duty levied on steam 208.

Separation stream 222 discharges from regeneration reactor 202 and is comprised of gaseous $CO_2$ generated via reaction (2) and $H_2O$ within steam 208 which does not participate in reaction (3). In the embodiment shown, the separation stream 222 discharges at 400° C. and 280 psig, and is directed to separation unit 215 after cooling by heat exchanger 214. Separation unit 215 divides separation stream 222 into $CO_2$ stream 216 and $H_2O$ stream 217 and operates according to methods well known in the art for the separation of $H_2O$ from a gaseous stream.

As previously discussed, when the magnesium carbonate is exposed to steam in regeneration reactor 202, a portion of the MgO produced by reaction (2) will further undergo reaction (3) to produce $Mg(OH)_2$, but complete rehydroxylation of MgO to $Mg(OH)_2$ in regeneration reactor 202 is unfavorable in the presence of the liberated $CO_2$ and high temperature conditions. For example, for the embodiment shown at FIG. 2 using an essentially 100% sorbent utilization factor, steam regeneration in absorption reactor 202 under the conditions illustrated would be expected to produce a mixture of approximately 37.2 mol % $Mg(OH)_2$ and approximately 59.4 mol % MgO, with approximately 3.4 mol % $MgCO_3$ remaining. As a result, a mixture comprised of both $Mg(OH)_2$ and MgO is transferred to polishing reactor 203 via transport path 210. Transfer via transport path 210 may be accomplished in a variety of ways, including moving bed arrangements, fluidized transfer of pellets, and other means known to those skilled in the art. During the transfer, the mixture is cooled to approximately 200° C. via heat exchanger 218 utilizing cooling water at approximately 20° C.

Polishing reactor 203 is at a temperature of approximately 200° C. and a pressure of approximately 280 psig. Polishing reactor 203 receives the mixture of $Mg(OH)_2$ and MgO via transport path 210 and further receives rehydroxylation stream 206, comprised of approximately 53.5 mol % $H_2$ and 46.5 mol % $H_2O$. Under the conditions provided by polishing reactor 203, thermodynamic equilibrium of the $Mg(OH)_2$—MgO—$H_2O$ system results in a polished magnesium hydroxide sorbent of substantially all $Mg(OH)_2$. The $H_2$ in the hydroxylation stream and the remaining $MgCO_3$ from regeneration reactor 202 reside as inert components within this equilibrium. Additionally, heat exchanger 219 utilizes cooling water at approximately 20° C. to transfer exothermic heat from polishing reactor 203 to maintain temperature and pressure conditions as reaction (3) proceeds.

Fuel stream 220 is discharged from polishing reactor 203 and sent to power island 221. For the particular embodiment illustrated at FIG. 2, fuel stream 220 is comprised of approximately 56.5 mol % $H_2$ and 43.5 mol % $H_2O$. In a particular embodiment, power island 221 is a combined cycle combusting $H_2$ provided by fuel stream 220 and producing generated steam, which supplies steam 208 to regeneration reactor 202. The remainder of the generated steam would be used for the generation of electricity. Additionally, polished magnesium hydroxide sorbent is transferred from polishing reactor 203 to absorption reactor 201 via transport path 212 for service as the regenerable magnesium hydroxide sorbent. Transfer via transport path 212 may be accomplished in a variety of ways, including moving bed arrangements, fluidized transfer of pellets, and other means known to those skilled in the art.

The disclosure thus provides a process for $CO_2$ separation using a regenerable $Mg(OH)_2$ sorbent. The process absorbs $CO_2$ through the formation of $MgCO_3$ and releases water product $H_2O$. The $MgCO_3$ is partially regenerated through direct contact with steam, which acts to heat the magnesium carbonate to a higher temperature, provide heat duty required to decompose the magnesium carbonate to yield MgO and $CO_2$, provide an $H_2O$ environment over the magnesium carbonate thereby shifting the equilibrium and increasing the potential for $CO_2$ desorption, and supply $H_2O$ for rehydroxylation of a portion of the MgO. The partial regeneration produces a mixture of $Mg(OH)_2$ and MgO. In order to rehydroxylate the remaining MgO in order to produce a sorbent of substantially all $Mg(OH)_2$ and thereby maintain the $CO_2$ capture capacity of the sorbent, the mixture is polished in the absence of $CO_2$ using water product $H_2O$ produced during the $CO_2$ absorption. The sorbent now comprised substantially of $Mg(OH)_2$ is then available for further $CO_2$ absorption duty in a cyclic process.

The process as disclosed may be utilized in a pre-combustion $CO_2$ capture process integrated with a combined cycle producing generated steam. In this embodiment, $CO_2$ capture as disclosed operates on a stream of shifted syngas, separating the shifted syngas into a stream of $CO_2$ and a $CO_2$-depleted stream comprised of $H_2$ and water product $H_2O$. Partial regeneration producing the mixture of $Mg(OH)_2$ and MgO is conducted with generated steam from the combined cycle plant. The $CO_2$ depleted stream is utilized for the final polishing of MgO to $Mg(OH)_2$ in the sorbent using the water product $H_2O$, and fuel stream comprised of $H_2$ and $H_2O$ from the $CO_2$-depleted stream is generated and sent to the combined cycle power island for $H_2$ combustion. In a particular embodiment, absorption occurs at approximately 200° C., steam regeneration occurs at approximately 400° C. and polishing occurs at approximately 200° C. These temperatures allow $CO_2$ absorption at warm gas temperatures and avoids the necessity for cooling and subsequent reheat of the shifted syngas stream for pre-combustion $CO_2$ removal. Further, the process is compatible with $H_2O$ in the shifted syngas stream, avoiding requirements for dehydration prior to removal.

The disclosure thus provides a process utilizing a regenerable $Mg(OH)_2$ sorbent for the separation of $CO_2$ from a gaseous stream for the production of a moderate or high temperature $CO_2$-depleted gas stream.

Further, the disclosure provides a process utilizing a regenerable $Mg(OH)_2$ sorbent for the separation of $CO_2$ from a gaseous stream where the regenerable sorbent maintains activity over a number of absorption/desorption cycles.

Further, the disclosure provides a process utilizing a regenerable $Mg(OH)_2$ sorbent for the separation of $CO_2$ from a gaseous stream using steam regeneration of the $Mg(OH)_2$ sorbent followed by a polishing process to maintain sorbent activity.

Further, the disclosure provides a process utilizing a regenerable $Mg(OH)_2$ sorbent for the separation of $CO_2$ from a gaseous stream using steam regeneration followed by a polishing process, where the polishing process utilizes water liberated during the $CO_2$ absorption process such that water requirements are reduced.

Further, the disclosure provides a process utilizing a regenerable $Mg(OH)_2$ sorbent for the separation of $CO_2$ from a syngas stream comprised of $H_2$ and $CO_2$ prior to $H_2$ combustion in a combined cycle plant, utilizing steam generated by the combined cycle plant.

Further, the disclosure provides a process utilizing a regenerable $Mg(OH)_2$ sorbent for the separation of $CO_2$ from a gaseous stream in a manner tolerant to $H_2O$ in the gaseous stream, avoiding requirements for dehydration prior to $CO_2$ separation.

Further, the disclosure provides a process utilizing a regenerable $Mg(OH)_2$ sorbent for the separation of $CO_2$ from a gaseous stream at warm gas temperatures, avoiding the necessity for cooling and subsequent reheat of the gaseous stream for pre-combustion $CO_2$ removal.

Having described the basic concept of the invention, it will be apparent to those skilled in the art that the foregoing detailed disclosure is intended to be presented by way of example only, and is not limiting. Various alterations, improvements, and modifications are intended to be suggested and are within the scope and spirit of the present invention. Additionally, the recited order of elements or sequences, or the use of numbers, letters, or other designations therefore, is not intended to limit the claimed processes to any order except as may be specified in the claims. Accordingly, the invention is limited only by the following claims and equivalents thereto.

All publications and patent documents cited in this application are incorporated by reference in their entirety for purposes to the same extent as if each individual publication or patent document were so individually denoted.

What is claimed is:

1. A method of separating $CO_2$ from a process gas stream comprised of $CO_2$ and other gaseous constituents in an absorption/desorption cycle using a regenerable magnesium hydroxide sorbent, comprising:

contacting the process gas stream with the regenerable magnesium hydroxide sorbent in an absorption reactor at a first temperature, where the regenerable magnesium hydroxide sorbent is comprised of a first magnesium hydroxide, and where the first temperature is sufficient to cause some portion of the first magnesium hydroxide to react with some portion of the $CO_2$ in the process gas stream to produce magnesium carbonate and a water product, thereby separating the some portion of the $CO_2$ from the process gas stream, and transferring heat from the absorption reactor with a first heat transfer to maintain the absorption reactor at the first temperature;

discharging a rehydroxylation stream from the absorption reactor, where the rehydroxylation stream is comprised of some portion of the water product;

transferring the magnesium carbonate to a regeneration reactor and introducing a flow of steam to the regeneration reactor, and contacting some portion of the magnesium carbonate with the flow of steam, where the flow of steam is at a second temperature, where the second temperature is sufficient to decompose the some portion of the magnesium carbonate to produce magnesium oxide and gaseous carbon dioxide, and such that some portion of the magnesium oxide reacts with water in a first portion of the flow of steam to produce a second magnesium hydroxide;

discharging a separation stream from the regeneration reactor, where the separation stream is comprised of the gaseous carbon dioxide and a second portion of the flow of steam;

transferring the magnesium oxide and the second magnesium hydroxide to a polishing reactor at a third temperature and introducing the rehydroxylation stream into the polishing reactor, where the third temperature is less than the second temperature, and where the third temperature is sufficient to cause some portion of the magnesium oxide to react with some quantity of the some portion of the water product in the rehydroxylation stream to produce a third magnesium hydroxide, thereby producing a polished magnesium hydroxide sorbent, where the polished magnesium hydroxide sorbent is comprised of the second magnesium hydroxide and the third magnesium hydroxide, and transferring heat from the polishing reactor with a second heat transfer to maintain the polishing reactor at the third temperature; and transferring the polished magnesium hydroxide sorbent to the absorption reactor and repeating the contacting the process gas stream step using the polished magnesium hydroxide sorbent as the regenerable magnesium hydroxide sorbent, thereby separating $CO_2$ from the process gas stream comprised of $CO_2$ and other gaseous constituents in the absorption/desorption cycle using the regenerable magnesium hydroxide sorbent.

2. The method of claim 1 where the second magnesium hydroxide comprises greater than 30 mole percent of the magnesium oxide and the second magnesium hydroxide transferred to the polishing reactor.

3. The method of claim 1 where the first temperature is between from about 150° C. to about 315° C., and where the second temperature is at least 375° C., and where the third temperature is between from about 150° C. to about 315° C., and where pressure in the regeneration reactor is greater than 10 atmospheres.

4. The method of claim 3 where the second temperature is at least 400° C., and where pressure in the regeneration reactor is at least 20 atmospheres.

5. The method of claim 1 where the process gas stream is a shifted syngas stream from a water-gas-shift reactor.

6. The method of claim 1 where the second temperature is maintained by a third heat transfer from the flow of steam to the regeneration reactor.

7. The method of claim 1 further comprising introducing the separation stream to a separation chamber, where the separation chamber is maintained at a temperature such that a quantity of the second portion of the flow of steam condenses to a liquid water, and including discharging a $CO_2$ stream from the separation chamber, where the $CO_2$ stream is the separation stream less the quantity of the second portion of the flow of steam.

8. The method of claim 1 where the process gas stream is further comprised of a first quantity of $H_2$, where the first quantity of $H_2$ is at least 10 mole percent of the process gas stream, and where the rehydroxylation stream is further comprised of a second quantity of $H_2$, where the second quantity of $H_2$ is comprised of some portion of the first quantity of $H_2$, and where the second quantity of $H_2$ is at least 10 mole percent of the rehydroxylation stream, and further comprised of discharging a fuel stream from the polishing reactor, where the fuel stream is comprised of a third quantity of $H_2$, where the third quantity of $H_2$ is comprised of some portion of the second quantity of $H_2$, and where the third quantity of $H_2$ is at least 10 mole percent of the fuel stream.

9. The method of claim 8 further comprised of producing generated steam from a power island combusting at least a portion of the third quantity of $H_2$ comprising the fuel stream, and supplying some portion of the generated steam to the regeneration reactor, such that the some portion of the generated steam serves as the flow of steam in the regeneration reactor.

10. The method of claim 8 where the rehydroxylation stream is further comprised of a quantity of $CO_2$, where the quantity of $CO_2$ is comprised of the $CO_2$ comprising the process gas stream less the some portion of the $CO_2$ separated from the process gas stream in the absorption reactor.

11. A method of separating $CO_2$ from a process gas stream in an absorption/desorption cycle using a regenerable magnesium hydroxide sorbent, where the process gas stream is comprised of $CO_2$ and a first quantity of $H_2$, and where the first quantity of $H_2$ is at least 10 mole percent of the process gas stream, comprising:

contacting the process gas stream with the regenerable magnesium hydroxide sorbent in an absorption reactor at a first temperature, where the regenerable magnesium hydroxide sorbent is comprised of a first magnesium hydroxide, and where the first temperature is sufficient to cause some portion of the first magnesium hydroxide to react with some portion of the $CO_2$ in the process gas stream to produce magnesium carbonate and a water product, thereby separating the some portion of the $CO_2$ from the process gas stream, and transferring heat from the absorption reactor with a first heat transfer to maintain the absorption reactor at the first temperature;

discharging a rehydroxylation stream from the absorption reactor, where the rehydroxylation stream is comprised of some portion of the water product, and where the rehydroxylation stream is comprised of a second quantity of $H_2$, where the second quantity of $H_2$ is comprised of some portion of the first quantity of $H_2$, and where the second quantity of $H_2$ is at least 10 mole percent of the rehydroxylation stream;

transferring the magnesium carbonate to a regeneration reactor and introducing a flow of steam to the regeneration reactor, and contacting some portion of the magnesium carbonate with the flow of steam, where the flow of steam is at a second temperature, where the second temperature is sufficient to decompose the some portion of the magnesium carbonate to produce magnesium oxide and gaseous carbon dioxide, and such that some portion of the magnesium oxide reacts with water in a first portion of the flow of steam to produce a second magnesium hydroxide;

discharging a separation stream from the regeneration reactor, where the separation stream is comprised of the gaseous carbon dioxide and a second portion of the flow of steam;

transferring the magnesium oxide and the second magnesium hydroxide to a polishing reactor at a third temperature and introducing the rehydroxylation stream into the polishing reactor, where the third temperature is less than the second temperature, and where the third temperature is sufficient to cause some portion of the magnesium oxide to react with some quantity of the some portion of the water product in the rehydroxylation stream to produce a third magnesium hydroxide, thereby producing a polished magnesium hydroxide sorbent, where the polished magnesium hydroxide sorbent is comprised of the second magnesium hydroxide and the third magnesium hydroxide, and transferring heat from the polishing reactor with a second heat transfer to maintain the polishing reactor at the third temperature;

discharging a fuel stream from the polishing reactor, where the fuel stream is comprised of a third quantity of $H_2$, where the third quantity of $H_2$ is comprised of some portion of the second quantity of $H_2$, and where the third quantity of $H_2$ is at least 10 mole percent of the fuel stream; and transferring the polished magnesium hydroxide sorbent to the absorption reactor and repeating the contacting the process gas stream step using the polished magnesium hydroxide sorbent as the regenerable magnesium hydroxide sorbent, thereby separating $CO_2$ from the process gas stream comprised of $CO_2$ and other gaseous constituents in the absorption/desorption cycle using the regenerable magnesium hydroxide sorbent.

12. The method of claim 11 where the first temperature is between from about 150° C. to about 315° C., and where the second temperature is at least 375° C., and where the third temperature is between from about 150° C. to about 315° C., and where pressure in the regeneration reactor is greater than 10 atmospheres.

13. The method of claim 12 where the second temperature is at least 400° C., and where pressure in the regeneration reactor is at least 20 atmospheres.

14. The method of claim 12 including producing generated steam from a combined cycle combusting at least a portion of the third quantity of $H_2$ comprising the fuel stream, and supplying some portion of the generated steam to the regeneration reactor, such that the some portion of the generated steam serves as the flow of steam in the regeneration reactor.

15. The method of claim 14 where the process gas stream is a shifted syngas stream.

16. The method of claim 11 where the process gas stream is a shifted syngas stream from a water-gas-shift reactor.

17. The method of claim 11 further comprising introducing the separation stream to a separation chamber, where the separation chamber is maintained at a temperature such that a quantity of the second portion of the flow of steam condenses to a liquid water, and including discharging a $CO_2$ stream from the separation chamber, where the $CO_2$ stream is the separation stream less the quantity of the second portion of the flow of steam.

18. The method of claim 11 where the second magnesium hydroxide comprises greater than 30 mole percent of the magnesium oxide and the second magnesium hydroxide transferred to the polishing reactor.

19. The method of claim 11 where the rehydroxylation stream is further comprised of a quantity of $CO_2$, where the quantity of $CO_2$ is comprised of the $CO_2$ comprising the process gas stream less the some portion of the $CO_2$ separated from the process gas stream in the absorption reactor.

* * * * *